April 19, 1966  C. HADDAD ETAL  3,246,484
SLIP JOINT

Filed April 3, 1964  2 Sheets-Sheet 1

THOMAS H. RISK
WILLIAM H. SMITH
CHARLES HADDAD
INVENTORS

BY
John R. Faulkner
Jerry D. Beck
ATTORNEYS

April 19, 1966  C. HADDAD ETAL  3,246,484
SLIP JOINT
Filed April 3, 1964  2 Sheets-Sheet 2
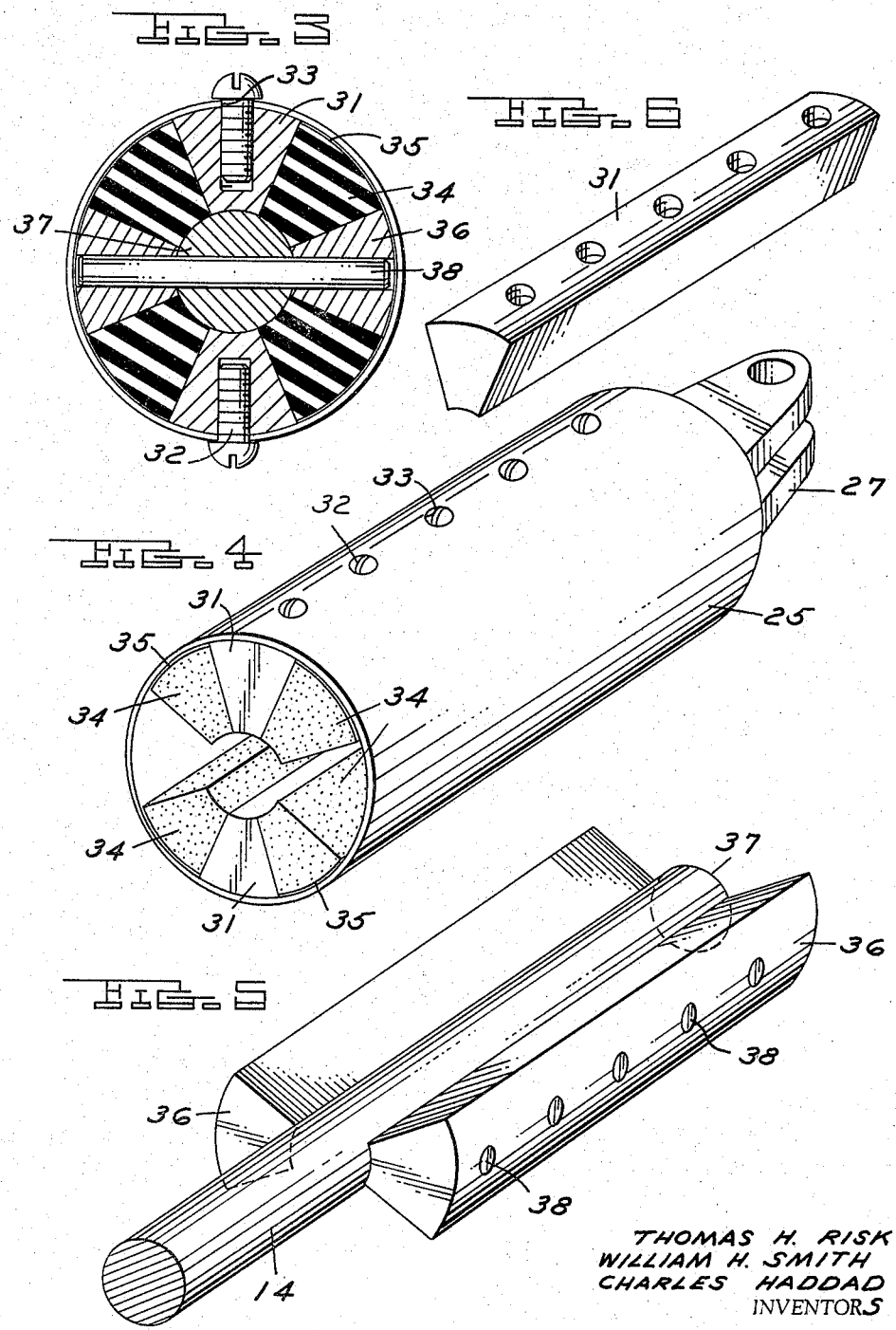
THOMAS H. RISK
WILLIAM H. SMITH
CHARLES HADDAD
INVENTORS
BY John R. Faulkner
Jerry D. Beck
ATTORNEYS

United States Patent Office 3,246,484
Patented Apr. 19, 1966

3,246,484
SLIP JOINT
Charles Haddad, Allen Park, Thomas H. Risk, Birmingham, and William H. Smith, Southfield, Mich., assignors to Ford Motor Company, Dearborn, Mich., a corporation of Delaware
Filed Apr. 3, 1964, Ser. No. 357,210
4 Claims. (Cl. 64—23)

This invention relates to slip joints and more particularly to a slip joint for use between driving and driven members that permits relative axial movement while transmitting torque between the joined members.

A driveline assembly in an automobile must accommodate the elongation of the power transmitting shafts which takes place when either the road wheel moves with respect to the differential or the differential moves with respect to the transmission. One customary way to accommodate this elongation is to place a spline connection between the shafts.

In recent years, the demand for increased leg room and more comfortable, quieter ride in a motor vehicle has brought about changes in the geometric arrangement of suspension systems and in the lowering of the drive shaft underneath the vehicle to reduce the height of the tunnel in the floor pan. These recent changes have resulted in the requirement for further increasing the "slip" between the drive shaft sections.

Conventional steel spline connections have not proven too satifsactory to provide the necessary axial sliding movement as a high static friction exists in such connections. Steel splines produce a considerable amount of noise and also transmit vibration to the vehicle body to the discomfort of the occupants of the vehicle. A substantial increase in axial movement results in high friction, and, especially when high torque loads are applied, may readily result in the failure of the splined elements.

An objectionable "clunking" noise occurs when the static friction in a splined joint between propeller shaft sections is overcome by an axial force acting thereon due to a sudden bump encountered by the road wheel at the moment high torque is transmitted through the drive shaft to the drive wheels. This noise has become even more objectionable during recent years due to the general adoption of high torque engines.

Accordingly, the present invention provides a slip joint for use between driving and driven members that overcomes the disadvantages of presently known slip joints.

In a preferred embodiment of this invention, a slip joint between shaft sections comprises a tubular housing that is connected to a first drive shaft section. A pair of lugs are rigidly attached to the inside wall of the housing at circumferentially spaced intervals. Resilient inserts are bonded or molded to opposed surfaces of each lug. A second drive shaft section, which is to be joined to the first drive shaft section, has an end portion with ears extending radially outwardly. This end portion is telescopically received in the housing with the ears disposed in the spaces between the inserts.

The surfaces of the resilient inserts in contact with the ears are treated or coated with a substance so as to provide little friction between them. The inserts must be of sufficient resiliency to prevent vibration and noise from being transmitted from one shaft section to the other. At the same time, the inserts must fulfill the requirement of transmitting full torque between the drive shaft sections.

Therefore, it is one of the principal objects of this invention to provide a slip joint that will permit low friction axial movement between shaft sections.

It is a further object of this invention to provide a slip joint that is relatively service free and requires little or no lubrication.

A still further object of this invention is to provide a slip joint between shafts which will reduce the transmission of noise and vibration from the first shaft to the second shaft and eliminate objectionable noises that may occur within the slip joint itself.

Other objects and advantages of this invention will become more apparent from the following description when considered in connection with the accompanying drawings in which:

FIGURE 3 is a cross sectional view of the assembled slip joint taken along line 6—6 of FIGURE 2;

FIGURE 4 is a perspective view of the tubular housing portion of the slip joint;

FIGURE 5 is a perspective view of the end of the driven shaft before it is telescopically received in the tubular housing portion of FIGURE 4;

FIGURE 6 is a perspective view of a driving lug before it is mounted in the slip joint.

Figure 1:
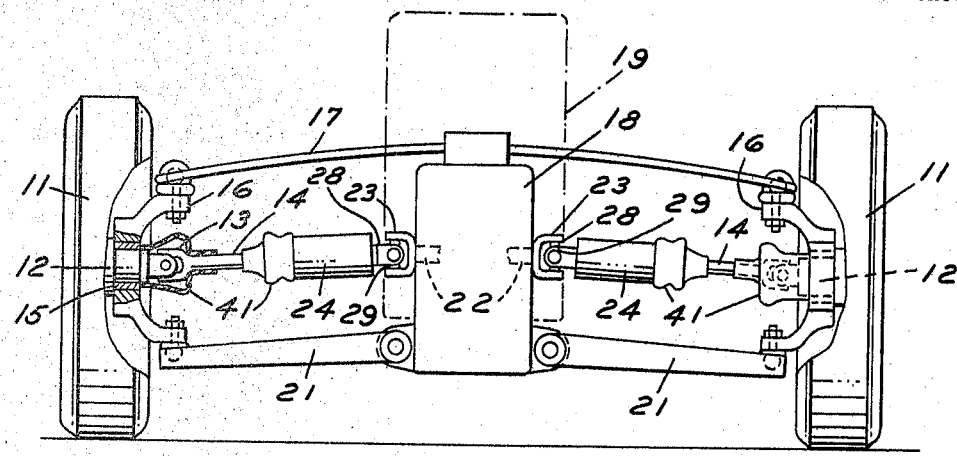
FIGURE 1 is a front elevational view of a portion of a motor vehicle chassis depicting a drive shaft assembly connecting the road wheels to the power unit of the vehicle.

FIGURE 1 discloses a preferred embodiment of the present invention incorporated in a vehicle having independently suspended steerable driving wheels 11. Such a construction might be used in a front wheel drive automobile.

Each road wheel 11 has a hub portion 12 that is universally connected at 13 to a shaft 14. A bearing member 15 journals each hub portion 12. A steerable wheel support member 16 supports each bearing member 15. The upper portion of each member 16 is connected by a ball joint to the outer end of a transversely extending leaf spring 17. The center of the leaf spring 17 is fastened to the top of a housing 18 enclosing the differential and transmission gearing of the vehicle. The housing 18 is located forwardly of an engine 19.

The lower portion of each wheel support member 16 is connected to the outwardly extending end of a lower suspension arm 21 that has its inner end pivotally supported from the housing 18. A pair of output shafts 22 extend laterally from the differential housing 18. The end of each output shaft 22 terminates in a universal joint yoke 23. Each of the yokes 23 is connected to a slip joint of this invention generally designated as 24.

Figure 2:
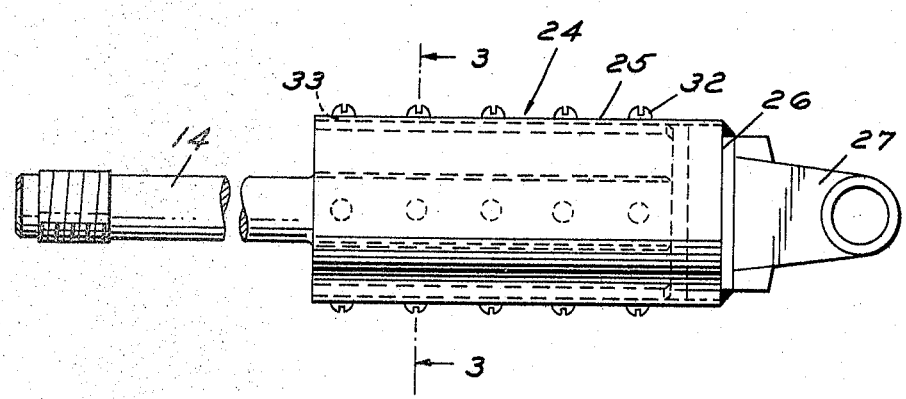
FIGURE 2 is a side elevational view of the drive shaft assembly of FIGURE 1.

As best seen in FIGURE 2, each of the slip joints 24 comprises a tubular housing 25 that is closed at its inward end by a plate 26. A bifurcated arm is welded to the plate 26 to form a yoke 27 of a universal joint 28 between the slip joint 24 and each shaft 22. The yokes 23 and 27 are coupled by a cross or spider 29 as seen in FIGURE 1.

A pair of elongated lugs 31 are provided with each lug having a cross sectional shape in the form of a sector of an annulus as best seen in FIGURE 3. The lugs 31 are disposed in a diametrically opposed relationship in the tubular housing 25 as seen in FIGURE 4 and are held in place by screws 32 inserted through holes 33 in the wall of the housing 25 and threaded into the lugs 31.

Four resilient inserts 34 are disposed in the housing 25 and bonded to the radial sides of the lugs 31. The inserts 34 are approximately of the same configuration as the lugs 31 except they are of smaller dimension and are spaced from the inner surface of the housing 25 as indicated by the slight clearance 35. The inserts 34 may be bonded or molded to the lugs 31 prior to the assembly of the lugs 31 in the housing 25. The inserts 34 and the lugs 31 extend axially of the housing 25 for nearly its entire length. Specific properties of the resilient inserts 34 will be hereinafter discussed in greater detail.

A second pair of diametrically opposed lugs or ears 36 extend radially outwardly from the end portion 37 of shaft 14 as best seen in FIGURE 5. A plurality of dowel pins 38 extend through both ears 36 and the end portion 37 to permanently fasten the ears 36 to the shaft 14.

The end portion 37 of the shaft 14 is telescopically received in the tubular housing 25 with the ears 36 disposed in the intervals between the inserts 34. The pair of ears 36, each of which is of the same configuration as lug 31, is in a generally perpendicular relationship to the pair of lugs 31 upon the insertion of the end portion 37 in the housing 25. As can be best seen in FIGURE 6, the radial surfaces of the inserts 34 are in flush engagement with the radial surfaces of the ears 36.

The end portion 37 of the shaft 14 received in the housing 25 is shorter in length than the housing 25 as best seen in FIGURE 2 so that some axial play between the joined shafts can be accommodated.

The inserts 34 are formed from a rubber or synthetic rubberlike material of sufficient hardness to withstand the stresses encountered when full torque is applied to the slip joint 24 but of sufficient resiliency to permit the absorption of noise and vibration.

The radial surfaces of the inserts 34 that are in engagement with the ears 36 are coated or treated to provide low friction properties. This can be accomplished by chlorinating the surfaces of the inserts 34 to form what is commonly called "slippery rubber," or the surfaces may be coated with either a silicone base grease or a petroleum base grease containing molybdenum disulfide. These types of greases are retained on the surfaces of the inserts 34 for long periods of time under varying load and weather conditions.

The universal connection at 13 and the open end of the tubular housing 25 may be protected against dirt and dust by rubber boot seals 41 as best seen in FIGURE 1.

The method of assembling the slip joint 24 of this invention entails the positioning of the end portion 37 of the shaft 14 of FIGURE 5 in the tubular housing 25 of FIGURE 4 prior to universally connecting the yoke 27 to the yoke 23 at the end of the shaft 22.

It is apparent from the description that, when the vehicle road wheel 11 moves in jounce or rebound, the slip joint 24 permits the shaft 14 to axially slide within the housing 25. Play between the shafts is prevented as the radial surfaces of the lugs 31 and ears 36 are maintained in surface engagement in the slip joint 24 during axial movement.

The treated or coated surfaces of the resilient inserts 34 will reduce the amount of friction encountered during relative axial movement between the joined parts within the slip joint 24. The reduction of static friction between these joined parts will prevent the occurrence of objectionable noises and increase the life of the slip joint 24. Also, the transmission of noise and vibration from the road wheels 11 to the vehicle body is substantially reduced as there is no metal to metal contact between the drive and driven members of the power transmitting shaft sections. The resilient inserts 34 fully isolate the lugs 31 attached to the tubular housing 25 from the ears 36 carried by the end portion 37 of the shaft 14.

The small clearance 35 provided between the inserts 34 and the inside wall of the housing 25 limits the deformation of these inserts 34 to a predetermined value so that constant angular velocity for the power transmitting shaft assembly is achieved after a minimum torque load is applied.

It will be understood that this invention is not to be limited to the exact construction shown and described but that various changes and modifications may be made without departing from the spirit and scope of the invention as defined in the appended claims.

We claim:
1. A slip joint between a rotatable driving shaft and a rotatable driven shaft, said driving shaft connected to a tubular housing, a plurality of axially extending lugs disposed in said housing and attached to the inside wall thereof, and a plurality of axially extending resilient inserts attached to opposed surfaces of said lugs, said driven shaft having an end portion with ears extending radially outwardly therefrom, said end portion being telescopically received in said housing with said ears disposed between said inserts and in surface to surface contact therewith, said inserts being forced by said lugs into driving engagement with said ears during rotation of said shafts, the surfaces of said inserts in engagement with said ears having been treated to provide low friction between said ears and said inserts during relative axial movement of said shafts, said resilient inserts also cushioningly inhibiting the transmission of noise and vibration therebetween.

2. A slip joint between a pair of shafts comprising a tubular housing connected to one end of one shaft, a plurality of elongated lugs disposed in and attached to the inside surface of said housing, said lugs extending axially of said housing and radially inwardly, axially extending resilient inserts having radial surfaces attached to opposed radial surfaces of each of said lugs, and an end portion of the other shaft having circumferentially spaced ears, said ears extending radially outwardly of said end portion, said end portion being telescopically received in said housing with the center axis of said end portion being in a concentric relationship to the axis of rotation of said housing and with the radial surfaces of said ears in engagement with the radial surfaces of said inserts, the surface to surface engagement of said inserts and said ears being characterized by low linear friction during axial movement between said pair of shafts, the resilient inserts substantially preventing relative rotary movement between said pair of shafts and also cushioningly inhibiting the transmission of noise and vibration therebetween.

3. A slip joint between a driven shaft and a driving shaft comprising a tubular housing universally connected to one end of said driving shaft, a pair of lugs disposed in diametrically opposed relationship and attached to the inside surface of said housing, said lugs axially extending of said housing and having a cross sectional shape in the form of a sector of an annulus, two pairs of resilient low friction inserts, each insert being bonded to a radial side of each lug, the other of said shafts having an end portion provided with a pair of diametrically opposed ears extending radially outwardly therefrom, said end portion being telescopically received in said housing in concentric relationship, said pair of ears being disposed between said inserts in a perpendicular relationship to said pair of lugs, each ear having a cross sectional shape in the form of a sector of an annulus, the outwardly extending radial sides of said ears being in sliding engagement with the radial sides of said inserts, said inserts drivingly engagng said ears upon rotation of said housing by the driving shaft, said inserts cushioningly inhibiting the transmission of noise and vibration from one shaft to the other shaft while permitting limited low friction axial movement therebetween.

4. A slip joint between a driven shaft and a driving shaft comprising a tubular housing universally connected to one end of said driving shaft, a pair of lugs disposed in a diametrically opposed relationship and attached to the inside surface of said housing, said lugs extending axially of said housing and having a cross sectional shape in the form of a sector of an annulus, two pairs of resilient inserts, each insert being bonded to the inwardly extending radial surface of each lug, a small clearance provided between each insert and the inside surface of said housing, the driven shaft having an end portion provided with a pair of diametrically opposed ears extending radially outwardly therefrom, said ears having a cross sectional shape in the form of a sector of an annulus, said end portion being telescopically received in said housing in an axially concentric relationship therewith, said pair of ears being received between said inserts, said pair of ears being generally arranged perpendicularly to said pair of lugs, radial sides of said ears being in abutment with said inserts, and a low friction substance interposed between abutting surfaces, said inserts drivingly engaging said ears upon rotation of said housing by said driving shaft, said inserts cushioningly inhibiting the transmission of vibration and noise from the driving shaft to be driven shaft, said low friction substance permitting low frictional axial movement between said shafts.

References Cited by the Examiner

UNITED STATES PATENTS

| | | | |
|---|---|---|---|
| 2,199,926 | 5/1940 | Swennes | 64—23 |
| 2,489,871 | 9/1958 | Moeller | 64—14 |
| 3,066,503 | 12/1962 | Fleming et al. | 64—23 |
| 3,149,481 | 9/1964 | Pierce | 64—14 |
| 3,183,684 | 5/1965 | Zeidler | 64—23 |

FOREIGN PATENTS 798,315    3/1936    France.

BROUGHTON G. DURHAM, *Primary Examiner.*

HALL C. COE, *Examiner.*